United States Patent

[11] 3,628,125

[72] Inventor Paul Dedieu
 Bourg-la-Reine, France
[21] Appl. No. 107,181
[22] Filed Jan. 18, 1971
[45] Patented Dec. 14, 1971
[73] Assignee Societe Alsacienne de Constructions
 Atomiques, de Telecommunications et
 d'Electronique (Alcatel)
 Paris, France
[32] Priority Jan. 16, 1970
[33] France
[31] 7001609

[54] DIRECT CURRENT HIGH-VOLTAGE GENERATOR
 8 Claims, 1 Drawing Fig.
[52] U.S. Cl. .................................................. 321/15
[51] Int. Cl. ...................................................... H02m 7/00
[50] Field of Search .......................................... 307/110;
 321/15

[56] References Cited
UNITED STATES PATENTS

| | | | |
|---|---|---|---|
| 2,619,602 | 11/1952 | Walker et al. ................ | 321/15 X |
| 3,320,513 | 5/1967 | Cleland ...................... | 321/15 |
| 3,484,866 | 12/1969 | Nakamura et al. ........... | 321/15 |
| 3,539,903 | 11/1970 | Goebel ....................... | 321/15 |

Primary Examiner—William M. Shoop, Jr.
Attorney—Craig, Antonelli and Hill

ABSTRACT: A direct current voltage generator which makes it possible to reduce the residual undulations originating from the alternating current source therein, including a first and a second transformer connected to a generator of the Cockroft-Walton type, two variable capacitors, and a coil with a slide contact connected to the secondary circuit of the second transformer for reducing the residual undulations at the supply frequency and an inductance for tuning the parasitic capacitances of the secondary circuit.

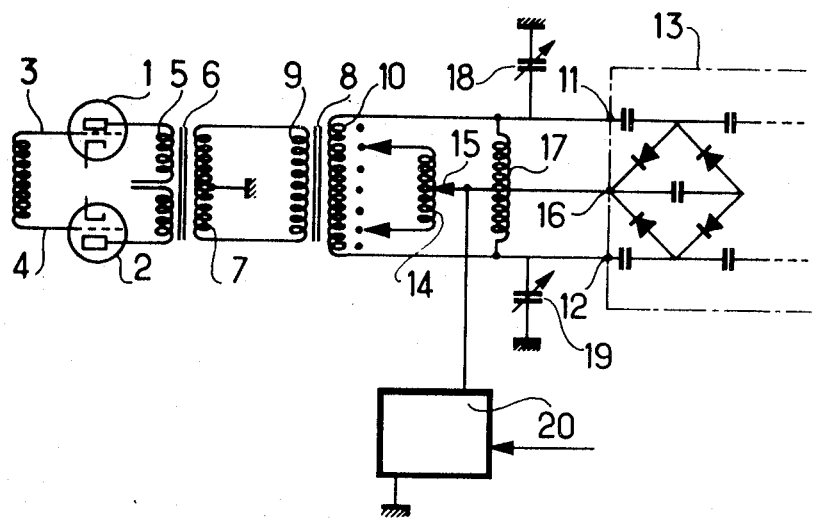

DIRECT CURRENT HIGH-VOLTAGE GENERATOR

The present invention relates to a direct current high-voltage generator, and more particularly to a power supply including a regulatory transformer for a voltage multiplier of the Cockroft-Walton type.

It is known in the art that it is possible to obtain very high direct current voltages by virtue of a multiplier comprising a column of capacitors which are supplied by means of rectifiers with a charging voltage so that the voltages are added up to the extend of the number of stages in the column. The greater the number of stages in the column, the higher is the voltage generated. Two bases of the column connected to respective capacitor lines are supplied from the secondary winding of a step-up voltage transformer, and the central point of this secondary winding is connected to the base of the rectifier line of the column. At the primary winding of this transformer, there is provided the highest possible voltage which may be obtained from a standard generator; for example, a supply voltage provided by a high-frequency high-voltage generator.

When the voltage multiplier supplies an electron beam accelerator, as in the case of an electron microscope, the direct current voltage that is furnished must have a high degree of precision and should contain only a minimum of alternating components.

The transformers which have been utilized to date in conjunction with voltage multipliers of the Cockroft-Walton type have the drawback that dissymmetry of the stray or leakage inductances and of the parasitic capacitances cannot be avoided therein, since these quantities are never equal in the two windings, which increases the residual undulations at the operating frequency. It is known in fact that this spurious frequency is always present at the output of a Cockroft-Walton generator.

The generator according to the present invention makes it possible to obviate these drawbacks. By virtue of the present invention, it is possible, in fact, to reduce the residual undulations by means which perfect the symmetry of the elements of the transformer connected to the voltage multiplier and by employing resonant circuits which are tuned to the operating frequency of the generator.

The generator proposed by the present invention comprises an alternating current source and a multiplier of the Cockroft-Walton type consisting of a capacitor column, referred to as a power output column, which is supplied symmetrically from two so-called capacitor feed or supply lines, the bases of the capacitor lines in the column being fed or supplied from the alternating current source, one median terminal of this secondary winding being connected to the base of the rectifier line of the column. The present invention is characterized in that each of the bases of the column connected to the two supply lines is connected to ground by means of a variable capacitor, and a regulating inductance is connected across the secondary winding supplying voltage to the column via these supply lines.

One embodiment of the present invention, which is disclosed solely for purposes of illustration and is by no means intended to be a limit on the scope of the invention, will now be further described hereinafter, taken in connection with the accompanying drawing, the single FIGURE of which represents schematically one embodiment of the present invention.

As illustrated in the FIGURE, the invention includes a conventional low-frequency generator of 10 kHz. consisting for example of two triode tubes 1 and 2 mounted in a push-pull fashion and to whose grids 3 and 4 are applied voltages in phase opposition. The tubes 1 and 2 operate in class B. On the very tightly coupled windings of the primary 5 at the central point of a transformer 6, there appear currents originating from the plates of tubes 1 and 2, each of these currents forming half of a sinusoidal curve, as is well known in push-pull circuits. On the symmetrical secondary winding 7 of the transformer 6, there appears a sine curve which is produced due to the combination of the two half cycles. This symmetry of the two half cycles is particularly advantageous in order to reduce the degree or ratio of residual waveform variations or undulations. The generator may produce 10 kw. of power and a maximum voltage between peaks of 16 kv.

The transformer 8 steps the voltage from the transformer 6 up to 175 kv. Since the primary winding 9 of the transformer 8 is a single winding, the same sinusoidal current flows through the entire winding because all of the turns thereof are traversed by the same flux. An electrostatic screen (not shown) connected to ground prevents any capacitive coupling between the two windings 7 and 9.

The secondary winding 10 of the step-up voltage transformer 8 is connected at the ends thereof to the bases 11 and 12 of two capacitor lines of the column forming the voltage multiplier 13 of the Cockroft-Walton type. According to this invention, the reactive energy which is produced by the parasitic capacitances of the transformer 8 is compensated for by the reactive energy that is absorbed by a tuning inductance 17 connected across the terminals of the secondary winding 10. A regulatable coil 14 connected to selected intermediate terminals of the secondary winding 10 is equipped with a slide contact 15 which is connected to the base 16 of the rectifier line of the multiplier 13. An adequate displacement of the slide contact 15 and adjustment of the position of the coil 14 on the intermediate terminals of the secondary winding 10 makes it possible to obtain a reduction of the undulation to 10 kHz.

In addition, two regulatable capacitive compensators 18 and 19 make it possible to obtain a symmetry of the parasitic capacitances with respect to the secondary winding 10 of the transformer 8 and those parasitic capacitances fed back to the input terminals 11 and 12 from the multiplier 13. Furthermore, these compensators allow for a more perfect tuning of the inductance 17. The output of the transformer 8 is thus rendered perfectly symmetrical in both amplitude and phase, which makes it possible to reduce to a minimum the portion of the residual undulation at the supply frequency in the multiplier 13.

The tuning inductance 17 may be two henrys; while the capacitive compensators 18 and 19 are in the order of 5 picofarads. It is understood that the actual tuning of the resonant circuit is obtained form the balance of the parasitic capacitances originating in the inductance of the secondary winding 10, from the tuning inductance 17 and from the circuits linked with the multiplier 13.

The slide contact 15 receives from a regulation amplifier 20 a counter-reaction voltage which may increase up to 40 kv. This counter-reaction voltage is amplified in accordance with the variations in the very high voltage furnished by the voltage multiplier 13. However, the variations obtained do not exceed the 5 millionth part of the very high voltage, which may be 3 million volts.

Although the device described herein appears to be the most advantageous one for the purpose of carrying out the present invention in a particular technical application, it is to be understood that various modifications may be applied thereto without departing from the spirit and scope of the invention, and that it is quite possible to replace certain elements by different ones that will assure the same technical function.

The generator with which the present invention is concerned may be used in all cases where a high and stable voltage may be assured with a great deal of precision. One application of the present invention which is of particular interest is the acceleration of electrons in an electron microscope.

What is claimed is:

1. A direct current high-voltage generator comprising a voltage multiplier of the Cockroft-Walton type having first and second capacitor lines and a central rectifier line forming a plural stage multiplier column, an alternating current source, a principal supply transformer having a primary winding connected to said alternating current source and a secondary winding connected at respective ends to said first and second capacitor lines of said multiplier column, a regulating inductor connected across said secondary winding of said principal supply transformer, and a pair of variable capacitors connecting respective ends of said secondary winding of said principal supply transformer to ground, at least one tap of said secondary winding being connected to said central rectifier line of said multiplier column.

2. A direct current high-voltage generator as defined in claim 1, wherein the secondary winding of said principal supply transformer is provided with a plurality of taps, an auxiliary winding selectively connectable to said taps and having a sliding contact thereon connected to said central rectifier line of said multiplier column.

3. A direct current high-voltage generator as defined in claim 1, wherein said alternating current source includes an auxiliary transformer having a pair of primary windings connected in push-pull to a voltage generator and a secondary winding having a grounded center tap and being connected to the primary winding of said principal supply transformer.

4. A direct current high-voltage generator as defined in claim 3, wherein the secondary winding of said principle supply transformer is provided with a plurality of taps, an auxiliary winding selectively connectable to said taps, and having a sliding contact thereon connected to said central rectifier line of said multiplier column.

5. A direct current high-voltage generator comprising a voltage multiplier of the Cockroft-Walton type, an alternating current source, a principle supply transformer having a primary winding connected to said alternating current source and a secondary winding connected to said voltage multiplier, and a pair of variable capacitors connecting respective ends of said secondary winding to ground, for reducing the residual alternating components at the supply frequency.

6. A direct current high-voltage generator as defined in claim 5, further including means for tuning the parasitic capacitances of the secondary winding of said principle supply transformer consisting of an inductance connected across said secondary winding.

7. A direct current high-voltage generator as defined in claim 6, wherein the secondary winding of said principal supply transformer is provided with a plurality of taps, an auxiliary winding selectively connectable to said taps and having a sliding contact thereon connected to said multiplier column.

8. A direct current high voltage generator as defined in claim 7, wherein said alternating current source includes an auxiliary transformer having a pair of primary windings connected in push-pull to a voltage generator and a secondary winding having a grounded center tap and being connected to the primary winding of said principle supply transformer.

* * * * *